(12) United States Patent
Ishihara

(10) Patent No.: US 12,398,789 B2
(45) Date of Patent: Aug. 26, 2025

(54) DRIVE MODULE ASSEMBLY

(71) Applicant: BorgWarner Inc., Auburn Hills, MI (US)

(72) Inventor: Mitsuru Ishihara, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/819,511

(22) Filed: Aug. 29, 2024

(65) Prior Publication Data

US 2025/0075781 A1    Mar. 6, 2025

Related U.S. Application Data

(60) Provisional application No. 63/671,997, filed on Jul. 16, 2024, provisional application No. 63/535,553, filed on Aug. 30, 2023.

(51) Int. Cl.
*B60K 1/00*        (2006.01)
*B60K 6/365*      (2007.10)
(Continued)

(52) U.S. Cl.
CPC ............ *F16H 37/0813* (2013.01); *B60K 1/00* (2013.01); *B60K 17/043* (2013.01); *B60K 17/16* (2013.01);
(Continued)

(58) Field of Classification Search
CPC ......... B60K 17/00–17/36; B60K 23/06; B60K 2023/043; B60K 2023/046; B60K 23/04;
(Continued)

(56) References Cited

U.S. PATENT DOCUMENTS

| | | |
|---|---|---|
| 6,575,056 B1 | 6/2003 | Gnandt |
| 6,770,005 B2 | 8/2004 | Aikawa et al. |
| | (Continued) | |

FOREIGN PATENT DOCUMENTS

| | | |
|---|---|---|
| CN | 115195460 A | 10/2022 |
| DE | 102005022926 B3 | 2/2007 |
| | (Continued) | |

OTHER PUBLICATIONS

International Search Report for Application No. PCT/US2024/044395 dated Nov. 11, 2024, 2 pages.
(Continued)

*Primary Examiner* — Ernesto A Suarez
*Assistant Examiner* — Lillian T Nguyen
(74) *Attorney, Agent, or Firm* — Howard & Howard Attorneys PLLC

(57) ABSTRACT

A drive module assembly for use in a vehicle includes a housing defining a housing interior and an electric machine. The electric machine includes a rotor and a stator. The drive module assembly includes a first input shaft, a second input shaft, a first output shaft, a second output shaft, and a differential disposed downstream of at least the rotor. The drive module assembly also includes a gearset, a clutch, and a park lock. The gearset, the clutch, and the park lock are disposed downstream of the differential such that the gearset and the clutch are configured receive rotational torque from the differential through the first and second output shafts.

18 Claims, 9 Drawing Sheets

(51) Int. Cl.
  *B60K 17/04* (2006.01)
  *B60K 17/16* (2006.01)
  *F16H 37/08* (2006.01)
  *F16H 63/34* (2006.01)

(52) U.S. Cl.
  CPC ......... *B60K 17/20* (2013.01); *F16H 63/3416* (2013.01); *B60K 2001/001* (2013.01); *B60K 6/365* (2013.01); *B60Y 2200/92* (2013.01)

(58) Field of Classification Search
  CPC . B60K 6/365; B60K 1/00–02; F16H 63/3416; F16H 3/093; F16H 3/52–62; F16H 2200/2005; F16H 48/00–2048/426
  See application file for complete search history.

(56) References Cited

U.S. PATENT DOCUMENTS

| | | | |
|---|---|---|---|
| 8,499,868 B2 | 8/2013 | Fuechtner et al. | |
| 8,579,751 B2 | 11/2013 | Phillips | |
| 8,650,979 B2 | 2/2014 | Ren et al. | |
| 10,173,517 B2 | 1/2019 | Janson | |
| 10,320,277 B2 | 6/2019 | Gassmann | |
| 10,797,562 B2 | 10/2020 | Dlala et al. | |
| 10,920,858 B2 | 2/2021 | Haupt et al. | |
| 11,005,337 B2 | 5/2021 | Hung et al. | |
| 11,015,689 B2 | 5/2021 | Klurfeld et al. | |
| 11,025,113 B2 | 6/2021 | Dlala | |
| 11,054,001 B1 | 7/2021 | Tamai et al. | |
| 11,149,823 B2 | 10/2021 | Engerman | |
| 11,254,205 B2 | 2/2022 | Cook et al. | |
| 11,273,701 B2 | 3/2022 | Devreese et al. | |
| 11,293,534 B2 | 4/2022 | Downs et al. | |
| 11,306,803 B2 | 4/2022 | Yang et al. | |
| 11,320,047 B2 | 5/2022 | Miebach et al. | |
| 11,331,996 B2 | 5/2022 | Bayer et al. | |
| 11,391,348 B2 | 7/2022 | Xie et al. | |
| 11,394,270 B2 | 7/2022 | Hung et al. | |
| 11,421,774 B2 | 8/2022 | Tamura et al. | |
| 11,448,305 B2 * | 9/2022 | Engerman | B60K 17/04 |
| 11,623,510 B2 | 4/2023 | Engerman | |
| 11,761,521 B2 | 9/2023 | Wechs et al. | |
| 11,773,957 B2 | 10/2023 | Paoff et al. | |
| 11,784,531 B2 | 10/2023 | Makino et al. | |
| 11,784,532 B2 | 10/2023 | Makino et al. | |
| 11,794,572 B2 | 10/2023 | Engerman | |
| 11,845,328 B2 | 12/2023 | Downs et al. | |
| 11,852,224 B2 | 12/2023 | Brehmer et al. | |
| 11,873,885 B2 | 1/2024 | Labelle | |
| 11,873,897 B2 | 1/2024 | Nakamatsu et al. | |
| 11,906,034 B2 | 2/2024 | Nakamatsu et al. | |
| 11,913,527 B2 | 2/2024 | K?lbl | |
| 11,946,532 B2 | 4/2024 | Freiholtz et al. | |
| 2005/0252707 A1 * | 11/2005 | Bowen | B60K 17/35 180/235 |
| 2010/0154573 A1 | 6/2010 | Jackson et al. | |
| 2012/0129644 A1 | 5/2012 | Palfai et al. | |
| 2013/0123058 A1 * | 5/2013 | Markl | B60K 17/165 475/150 |
| 2014/0128194 A1 | 5/2014 | Mair et al. | |
| 2017/0136867 A1 * | 5/2017 | Holmes | B60K 6/48 |
| 2018/0112755 A1 | 4/2018 | Littlefield et al. | |
| 2019/0072168 A1 * | 3/2019 | Yamamura | B60K 1/00 |
| 2020/0158218 A1 | 5/2020 | Himmelbauer et al. | |
| 2021/0339614 A1 | 11/2021 | Walter | |
| 2021/0347257 A1 * | 11/2021 | Zalewski | B60K 23/04 |
| 2022/0136569 A1 | 5/2022 | Maurel | |
| 2022/0178404 A1 | 6/2022 | Zink et al. | |
| 2022/0250714 A1 | 8/2022 | Kuramoto et al. | |
| 2023/0008955 A1 | 1/2023 | Verbridge et al. | |
| 2023/0022088 A1 | 1/2023 | Reisch et al. | |
| 2023/0022395 A1 | 1/2023 | Holzl?hner et al. | |
| 2023/0088074 A1 | 3/2023 | Takahashi et al. | |
| 2023/0135813 A1 | 5/2023 | Reisch et al. | |
| 2023/0167898 A1 | 6/2023 | Li et al. | |
| 2023/0219410 A1 | 7/2023 | Lemaire et al. | |
| 2023/0219411 A1 | 7/2023 | Vassieux et al. | |
| 2023/0271499 A1 | 8/2023 | Markow | |
| 2023/0286376 A1 | 9/2023 | Kölbl | |
| 2023/0322071 A1 | 10/2023 | Voit et al. | |
| 2023/0341034 A1 | 10/2023 | Engerman et al. | |
| 2023/0382222 A1 | 11/2023 | Rapp et al. | |
| 2023/0406095 A1 | 12/2023 | Rossia et al. | |
| 2024/0001749 A1 | 1/2024 | Valente et al. | |
| 2024/0060558 A1 | 2/2024 | Wang et al. | |

FOREIGN PATENT DOCUMENTS

| | | |
|---|---|---|
| DE | 102011086743 A1 | 5/2013 |
| WO | 2022246054 A1 | 11/2022 |
| WO | 2023186744 A1 | 10/2023 |
| WO | 2024006418 A1 | 1/2024 |

OTHER PUBLICATIONS

International Search Report for Application No. PCT/US2024/044314 dated Nov. 13, 2024, 2 pages.

English language abstract and machine-assisted English translation for CN 115 195 460 A extracted from espacenet.com database on Nov. 26, 2024, 13 pages.

English language abstract and machine-assisted English translation for DE 10 2011 086 743 A1 extracted from espacenet.com database on Nov. 26, 2024, 16 pages.

Nanjundaswamy, Harsha et al., "Next Generation 80 V SiC High-Speed eDrive Technology for Electrified Propulsion", 32nd AIchen Colloquium Sustainable Mobility, 2023, 21 pages.

* cited by examiner

DRIVE MODULE ASSEMBLY

CROSS-REFERENCE TO RELATED APPLICATIONS

This application claims priority to and all the benefits of U.S. Provisional Application No. 63/535,553, filed Aug. 30, 2023, and U.S. Provisional Application No. 63/671,997, filed Jul. 16, 2024, which are hereby incorporated by reference in their entireties.

BACKGROUND OF THE INVENTION

1. Field of the Disclosure

The subject disclosure generally relates to a drive module assembly and, in particular, a drive module assembly for use in a vehicle.

2. Description of the Related Art

Conventional drive module assemblies include an electric machine configured to deliver rotational torque to wheels of a vehicle. To help deliver rotational torque to wheels of a vehicle, conventional drive module assemblies include gears and a differential to ultimately deliver the rotational torque from the electric machine to wheels of the vehicle to allow the vehicle to maneuver.

As hybrid vehicles and battery electric vehicles become more prevalent, the need for efficient and reliable drive module assemblies has become increasingly important. One of the main challenges in designing drive module assemblies for hybrid vehicles and battery electric vehicles is achieving high efficiency while maintaining a compact size and low weight. Hybrid vehicles and battery electric vehicles often have limited space available for the drive module assembly, and any added weight can reduce the vehicle's range and performance.

In recent years, advances in electric motor technology and power electronics have led to the development of more compact and efficient drive module assemblies. However, in recent years, due to this development of more compact drive module assemblies, there have been challenges with integrating parking locks within the drive module assemblies along with providing torque vectoring and/or limited slip capabilities, if desired. Therefore, there still remains a need for a drive module assembly being lighter and more compact, all while having improved efficiency and increased performance while addressing the deficiencies set forth above.

SUMMARY OF THE INVENTION

A drive module assembly for use in a vehicle includes a housing defining a housing interior and an electric machine. The electric machine includes a rotor disposed in the housing interior and extending along a rotor axis, and a stator disposed about the rotor with respect to the rotor axis such that the stator surrounds the rotor. The drive module assembly includes a first input shaft rotatably coupled to the rotor and disposed downstream of the rotor such that the first input shaft is configured to receive rotational torque from the rotor, and a second input shaft rotatably coupled to the rotor and disposed downstream of the rotor such that the second input shaft is configured to receive rotational torque from the rotor. The drive module assembly also includes a first output shaft rotatably coupled to the first input shaft and the rotor and disposed downstream of the rotor and the first input shaft such that the first output shaft is configured to receive rotational torque from the rotor and the first input shaft, and a second output shaft rotatably coupled to the second input shaft and the rotor and disposed downstream of the rotor and the second input shaft such that the second output shaft is configured to receive rotational torque from the rotor and the second input shaft. The drive module assembly further includes a differential rotatably coupled to the rotor, the first and second input shafts, and the first and second output shafts. The differential is disposed downstream of at least the rotor such that the differential is configured to receive rotational torque from the rotor. The drive module assembly also includes a gearset coupled to the first and second output shafts for selectively rotatably coupling the first and second output shafts to one another. The drive module assembly additionally includes a clutch rotatably coupled to one of the first and second output shafts and to the gearset. The clutch is actuatable between a first clutch position where the first and second output shafts are uncoupled from one another, and a second clutch position where the first and second output shafts are rotatably coupled to one another through the gearset. The drive module assembly further includes a park lock configured to move between a lock position where the park lock is coupled to the gearset such that the gearset and the first and second output shafts are locked, and an unlock position where the park lock is uncoupled from the gearset such that the gearset is unlocked. The gearset, the clutch, and the park lock are disposed downstream of the differential such that the gearset and the clutch are configured to receive rotational torque from the differential through the first and second output shafts.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION

Figure 1:
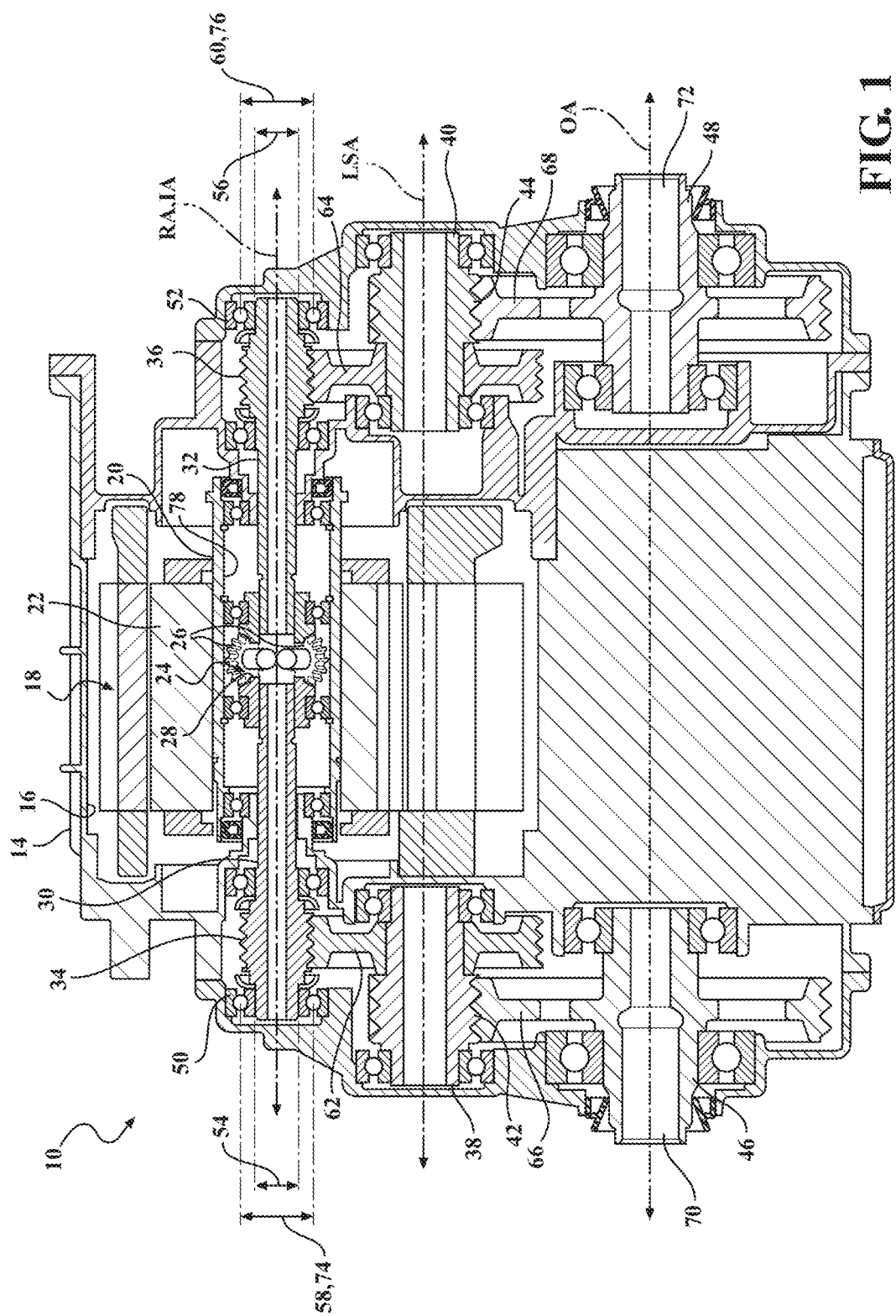
FIG. 1 is a cross-sectional view of a drive module assembly including a housing, an electric machine including a rotor and a stator, a differential, a first input shaft, a second input shaft, a first counter shaft, a second counter shaft, a first output shaft, and a second output shaft.

With reference to the Figures, wherein like numerals indicate like parts throughout the several views, a drive module assembly 10 for use in a vehicle, is shown in a cross-sectional view in FIG. 1. The vehicle may include an internal combustion engine and, therefore, be a hybrid vehicle. The vehicle may also be a battery electric vehicle that is free of an internal combustion engine. It is to be appreciated that the vehicle may include one or more of the drive module assembly 10 described below, such as two drive module assemblies.

The drive module assembly 10 includes a housing 14, which may be one or more components, defining a housing interior 16 and an electric machine 18. The electric machine 18 includes a rotor 20 disposed in the housing interior 16 and extending along a rotor axis RA, and a stator 22 disposed about the rotor 20 with respect to the rotor axis RA such that the stator 22 surrounds the rotor 20. The stator 22 may be commonly referred to as a lamination stack.

The drive module assembly 10 additionally includes a differential 24 rotatably coupled to the rotor 20, a first input shaft 30 rotatably coupled to the differential 24, and a second input shaft 32 rotatably coupled to the differential 24. The differential 24 may be directly rotatably coupled to the rotor 20 or may have an intermediate component or components between the rotor 20 and the differential 24. When the differential 24 is directly coupled to the rotor 20, the differential 24 may be directly coupled with the lamination steel of the rotor 20. Similarly, the differential 24 may be directly coupled to the first input shaft 30 and the second input shaft 32 or may have an intermediate component or components between the differential 24 and the first and second input shafts 30, 32. The differential 24 may include a differential pinion gear 26 and a differential side gear 28.

The rotor 20 may define a rotor interior 78 with the differential 24 disposed in the rotor interior 78. In such embodiments, the rotor 20 may be commonly referred to as a hollow rotor shaft. The first and second input shafts 30, 32 may be disposed in the rotor interior 78 when the rotor 20 is a hollow rotor shaft.

The drive module assembly 10 further includes a first counter shaft 38 rotatably coupled to the first input shaft 30, a second counter shaft 40 rotatably coupled to the second input shaft 32, a first output shaft 46 rotatably coupled to the first counter shaft 38, and a second output shaft 48 rotatably coupled to the second counter shaft 40. The first and second output shafts 38, 48 are typically configured to provide rotational torque to wheels of the vehicle. The first output shaft 46 may include a first output spline 70 and the second output shaft 48 may include a second output spline 72.

The differential 24 is configured to receive rotational torque from the electric machine 18 and configured to transmit rotational torque from the electric machine 18 to the first and second input shafts 30, 32. The first counter shaft 38 may have a first counter drive gear 42 that is rotatably coupled to the first counter shaft 38 and a second counter drive gear 44 that is rotatably coupled to the second counter shaft 40. The first counter drive gear 42 may be integral with the first counter shaft 38 and the second counter drive gear 44 may be integral with the second counter shaft 40.

Having the differential 24 configured to receive rotational torque from the electric machine 18 and configured to transmit rotational torque from the electric machine 18 to the first and second input shafts 30, 32 offers several advantages. First, the differential 24 is able to split the rotational torque received from the rotor 20 and is able to divide the rotational torque between the first input shaft 30 and the second input shaft 32. In other words, the first input shaft 30 may receive one half of the rotational torque from the electric machine 18 and the second input shaft 32 may receive the other half of the rational torque from the electric machine 18. Because the first input shaft 30 receives half of the rotational torque from the electric machine 18 and the second input shaft 32 receives the other half of the rotational torque from the electric machine 18, the size (diameter) of the first and second input shafts 30, 32 may be reduced, as described in further detail below. Second, having the differential 24 configured to receive rotational torque from the electric machine 18 and configured to transmit rotational torque from the electric machine 18 to the first and second input shafts 30, 32 allows for a compact design of the drive module assembly 10 all while enabling higher gear ratios, as described in further detail below.

The drive module assembly 10 may include a first counter driven gear 62 rotatably coupled to the first input shaft 30 and the first counter shaft 38 and configured to deliver rotational torque from the first input shaft 30 to the first counter shaft 38, and a second counter driven gear 64 rotatably coupled to the second input shaft 32 and the second counter shaft 40 and configured to deliver rotational torque from the second input shaft 32 to the second counter shaft 40.

The drive module assembly 10 may further include a first output gear 66 rotatably coupled to the first counter shaft 38 and the first output shaft 46 and configured to deliver rotational torque from the first counter shaft 38 to the first output shaft 46, and a second output gear 68 rotatably coupled to the second counter shaft 40 and the second output shaft 48 and configured to deliver rotational torque from the second counter shaft 40 to the second output shaft 48.

The drive module assembly 10 may include a first bearing 50 coupled to the first input shaft 30 and configured to support rotation of the first input shaft 30, and a second bearing 52 coupled to the second input shaft 32 and configured to support rotation of the second input shaft 32. The first input shaft 30 has a first input diameter 54, the second input shaft has a second input diameter 56, the first bearing 50 has a first bearing diameter 58, and the second bearing 52 has a second bearing diameter 60. Having the differential 24 configured to receive rotational torque from the electric machine 18 and configured to transmit rotational torque from the electric machine 18 to the first and second input shafts 30, 32 allows the first and second input diameters 54, 56 and the first and second bearing diameters 58, 60 to be reduced in size. For example, the first input diameter 54 may be less than 32 millimeters, and the second input diameter 56 may be less than 32 millimeters. In another embodiment, the first input diameter 54 may be less than 29 millimeters, and the second input diameter 56 may be less than 29 millimeters. In another embodiment, the first input diameter 54 may be less than 26 millimeters, and the second input diameter 56 may be less than 26 millimeters. In another embodiment, the first input diameter 54 may be less than 23 millimeters, and the second input diameter 56 may be less than 23 millimeters. In another embodiment, the first input diameter 54 may be less than 20 millimeters, and the second input diameter 56 may be less than 20 millimeters. In another embodiment, the first input diameter 54 may be less than 32 millimeters, and the second input diameter 56 may be less than 32 millimeters. As an additional example, the first bearing diameter 58 may be less than 43 millimeters, and the second bearing diameter 60 may be less than 43 millimeters. In another embodiment, the first bearing diameter 58 may be less than 41 millimeters, and the second bearing diameter 60 may be less than 41 millimeters. In another embodiment, the first bearing diameter 58 may be less than 39 millimeters, and the second bearing diameter 60 may be less than 39 millimeters. In another embodiment, the first bearing diameter 58 may be less than 37 millimeters, and the second bearing diameter 60 may be less than 37 millimeters. In one embodiment, the first input diameter 54 and the second input diameter 56 are 19 millimeters and the first bearing diameter 58 and the second bearing diameter 60 are 35 millimeters.

Typically, the first and second bearing diameters 58, 60 is dependent on the first and second input diameters 54, 56, respectively. In other words, depending on the first and second input diameters 54, 56, the first and second bearing diameters 58, 60 are adjusted. Having the differential 24 configured to receive rotational torque from the electric machine 18 and configured to transmit rotational torque from the electric machine 18 to the first and second input shafts 30, 32 allows the first and second input diameters 54, 56 to be reduced and, in turn, the first and second bearing diameters 58, 60 to be reduced, which ultimately allows for a higher gear ratio due to the reduced space occupied by the first and second input shafts 30, 32 and the first and second bearings 50, 52 in the drive module assembly 10. A reduced diameter in the first and second bearing diameters 58, 60 reduces the rotating pitch diameter speed of the first and second bearings 50, 52, which allows for greater selection in bearings to use in the drive module assembly 10.

Figure 2:
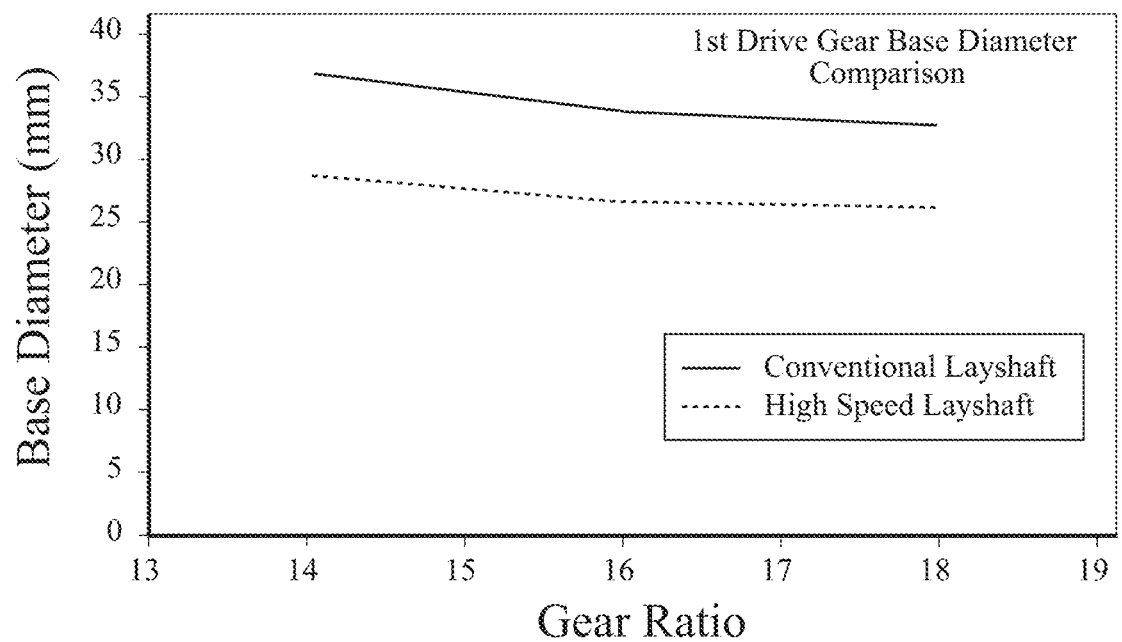
FIG. 2 is a graph illustrating a gear ratio versus a $1^{st}$ drive gear base diameter.
Figure 3:
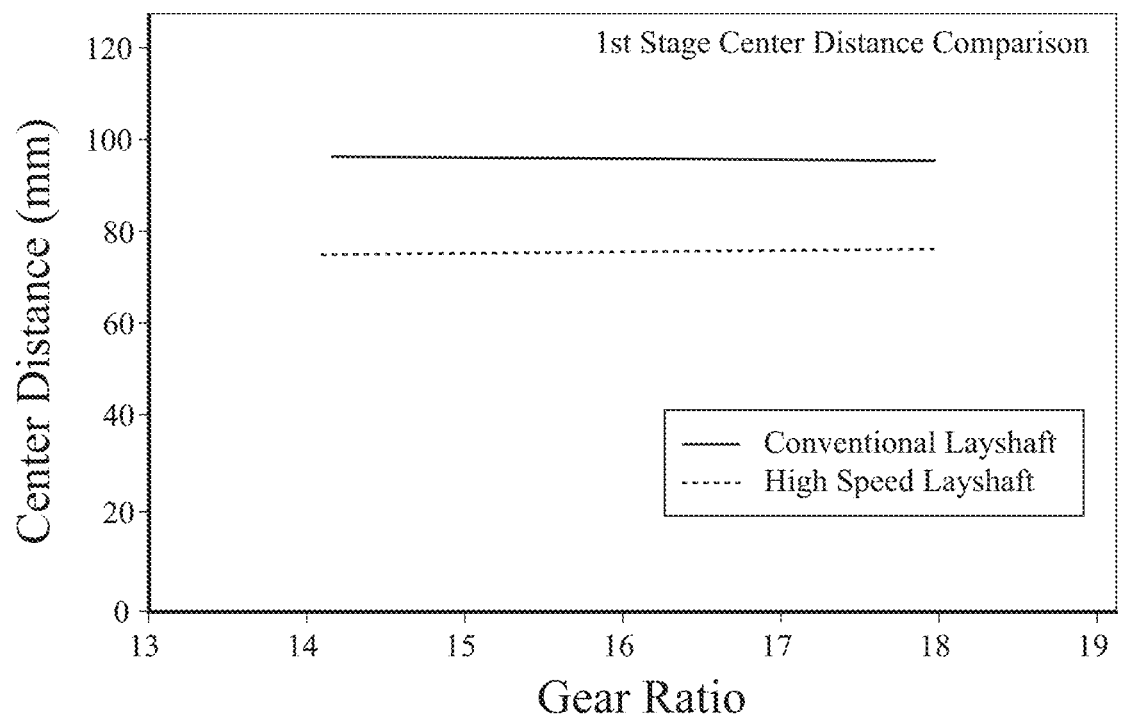
FIG. 3 is a graph illustrating a gear ratio versus a center distance between an input axis of the first and second input shafts and a counter shaft axis of the first and second counter shafts.

The first input shaft 30 may have a first input drive gear 34 that is rotatably coupled to the first input shaft 30 and a second input drive gear 36 that is rotatably coupled to the second input shaft 32. The first input drive gear 34 may be integral with the first input shaft 30 and the second input drive gear 36 may be integral with the second input shaft 32. The first input drive gear 34 may have a first drive gear diameter 74 and the second input drive gear 36 may have a second drive gear diameter 76. As described above, having the first input diameter 54 of the first input shaft 30 being decreased in size and the second input diameter 56 of the second input shaft 32 being decreased in size allows for decreased first and second bearing diameters 58, 60, but also allows for decreased first and second drive gear diameters 74, 76. Having the decreased first and second drive gear diameters 74, 76 allows for a higher gear ratio of the first and/or second input drive gears 34, 36, which is illustrated in FIG. 2. The base diameter in FIG. 2 refers to the first and/or second drive gear diameters 74, 76. Similarly, FIG. 3 illustrates a gear ratio of the first and/or second input drive gears 34, 36 versus a center distance. The center distance in the graph of FIG. 3 represents the distance between the input axis IA and the counter shaft axis CSA. To this end, the first and second input diameters 54, 56 impact the first and second drive gear diameters 74, 76 because the first and second drive gear diameters 74, 76 cannot be less than the first and second input diameters 54, 56, and, therefore, due to reduced diameter of the first and second input diameters 54, 56, the first and second drive gear diameters 74, 76 may be reduced, which allows for a higher gear ratio. A higher gear ratio allows for higher torque applications of the drive module assembly 10. For example, the drive module assembly 10 may have a peak torque of about 250 Nm, 300 Nm, 350 Nm, 400 Nm, 450 Nm, 500 Nm, 550 Nm, 600 Nm, 650 Nm, or more, a peak speed (such as the first and second input shafts 30, 32) of greater than 20,000 RPM, greater than 21,000 RPM, greater than 22,000 RPM, and greater than 23,000 RPM or more, and a gear ratio of 9, 10, 11, 12, 13, 14, 15, 16, 17, 18, 19 or greater.

The first and second input shafts 30, 32 may extend along an input axis IA, the first and second counter shafts 38, 40 may extend along a counter shaft axis CSA, and the first and second output shafts 46, 48 extend along an output axis OA. In one embodiment, the input axis IA, the counter shaft axis CSA, and the output axis OA are parallel to one another. The input axis IA, the counter shaft axis CSA, and the output axis OA may be offset from one another. In one embodiment, the counter shaft axis CSA is disposed between the input axis IA and the output axis OA.

Figure 4:
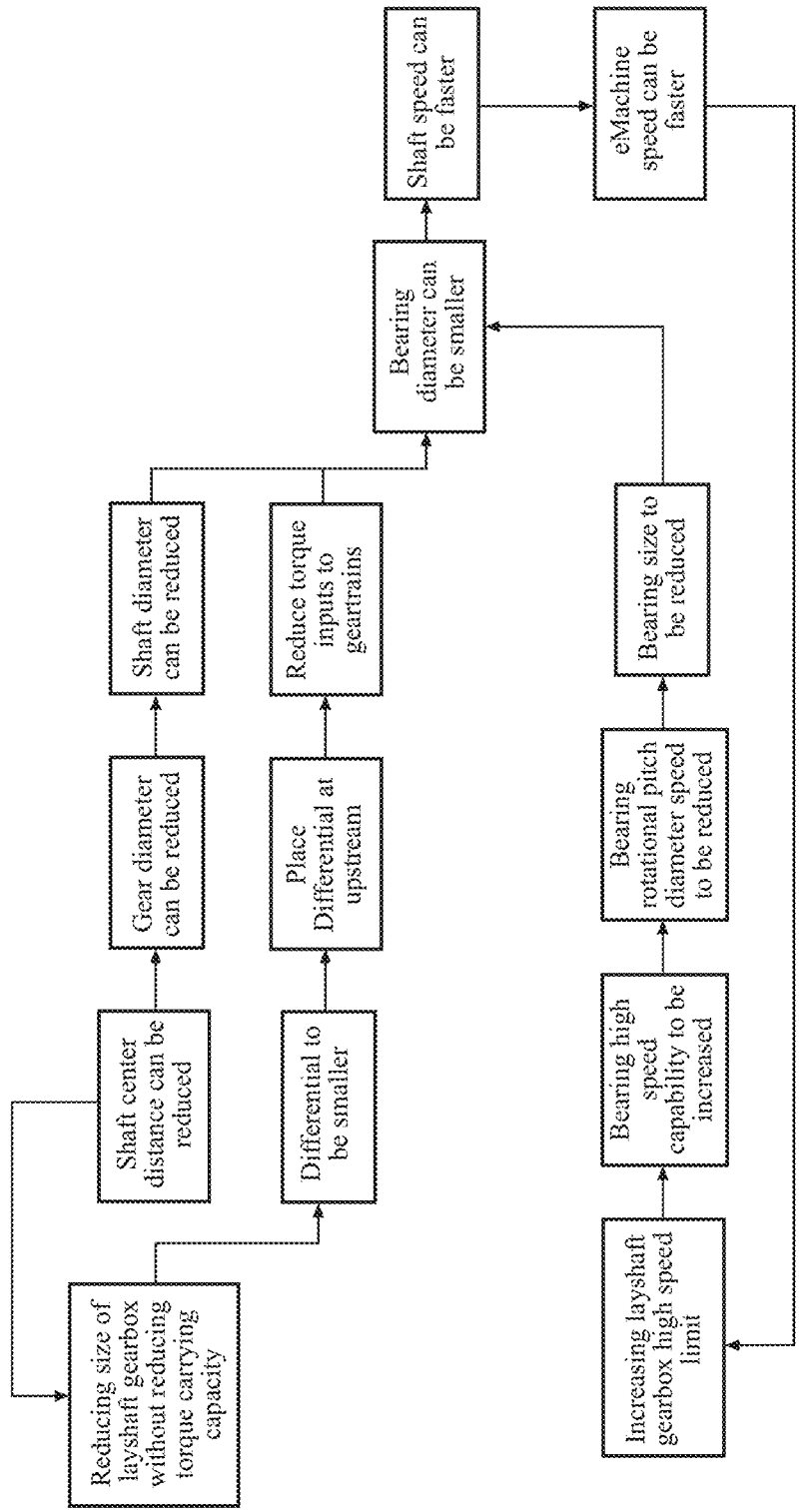
FIG. 4 is an exemplary flow diagram of reducing the size of the drive module assembly.

In addition to the advantages set forth above, having the differential 24 configured to receive rotational torque from the electric machine 18 and configured to transmit rotational torque from the electric machine 18 to the first and second input shafts 30, 32 allows the differential 24 to be smaller. This reduces the torque input to the geartrains, such as the first and second input drive gears 34, 36, the first and second counter driven gears 62, 64, and the first and second output gears 66, 68. Having a reduction in size of the differential 24 based on being configured to transmit rotational torque from the electric machine 18 to the first and second input shafts 30, 32 provides the opportunity, if desired, to reduce the first input diameter 54 of the first input shaft 30 and/or the second input diameter 56 of the second input shaft 32. Additionally, when the first input diameter 54 of the first input shaft 30 and the second input diameter 56 of the second input shaft 32 is reduced, a diameter of the first and second input drive gears 34, 36 may also be reduced. Due to a reduction in the diameter of the first and second input drive gears 34, 36, a distance defined between the input axis IA and the counter shaft axis CSA may also be reduced. Furthermore, when the first input diameter 54 of the first input shaft 30 and the second input diameter 56 of the second input shaft 32 is reduced, the first and second bearing diameters 58, 60 of the first and second bearings 50, 52 may also be reduced. Reducing the first and second bearing diameters 58, 60 then allows the first and second input shafts 30, 32 to rotate faster, which, in turn, allows the electric machine 18 to rotate the rotor 20 faster. This is summarized in FIG. 4.

With reference to FIGS. 5-11, another embodiment of the drive module assembly 10 is shown. Although not explicitly shown in FIG. 5, the drive module assembly 10 includes the housing 14, which may be one or more components, defining the housing interior 16, as illustrated in FIG. 1. With reference again to FIGS. 5 and 6, the drive module assembly 10 includes an electric machine 18 including the rotor 20 disposed in the housing interior 16 and extending along the rotor axis RA, and the stator 22 (not explicitly shown in FIGS. 5-11, see FIG. 1) disposed about the rotor 20 with respect to the rotor axis RA such that the stator 22 surrounds the rotor 20. The stator 22 may be commonly referred to as a lamination stack.

The drive module assembly 10 further includes the first input shaft 30 rotatably coupled to the rotor 20 and disposed downstream of the rotor 20 such that the first input shaft 30 is configured to receive rotational torque from the rotor 20. The drive module assembly 10 additionally includes the second input shaft 32 rotatably coupled to the rotor 20 and disposed downstream of the rotor 20 such that the second input shaft 320 is configured to receive rotational torque from the rotor 20. In the context of this disclosure, it is to be appreciated that when a first component is downstream of a second component that the second component receives rotational torque from the first component. For example, when the first and second input shafts 30, 32 are downstream of the rotor 20, the first and second input shafts 30, 32 receive rotational torque from the rotor 20, either directly (i.e., components are directly rotatably coupled to one another) or indirectly (i.e., there may be an intermediate component between the first component and the second component). It is also to be appreciated in the context of this disclosure that the first input shaft 30 and second input shaft 32 may be referred to as a first shaft and a second shaft, respectively. The first input shaft 30 and the second input shaft 32 provide rotational torque to the first and second output shafts 46, 48, respectively. The first input shaft 30 and second input shaft 32 receive rotational torque from the electric machine 18 and, therefore, may be referred to as output shafts with respect to the electric machine 18.

The drive module assembly 10 also includes the first output shaft 46 rotatably coupled to the first input shaft 30 and the rotor 20 and disposed downstream of the rotor 20 and the first input shaft 30 such that the first output shaft 46 is configured to receive rotational torque from the rotor 20 and the first input shaft 30. The drive module assembly 10 additionally includes the second output shaft 48 rotatably coupled to the second input shaft 32 and the rotor 20 and disposed downstream of the rotor 20 and the second input shaft 32 such that the second output shaft 48 is configured to receive rotational torque from the rotor 20 and the second input shaft 32.

Figure 5:
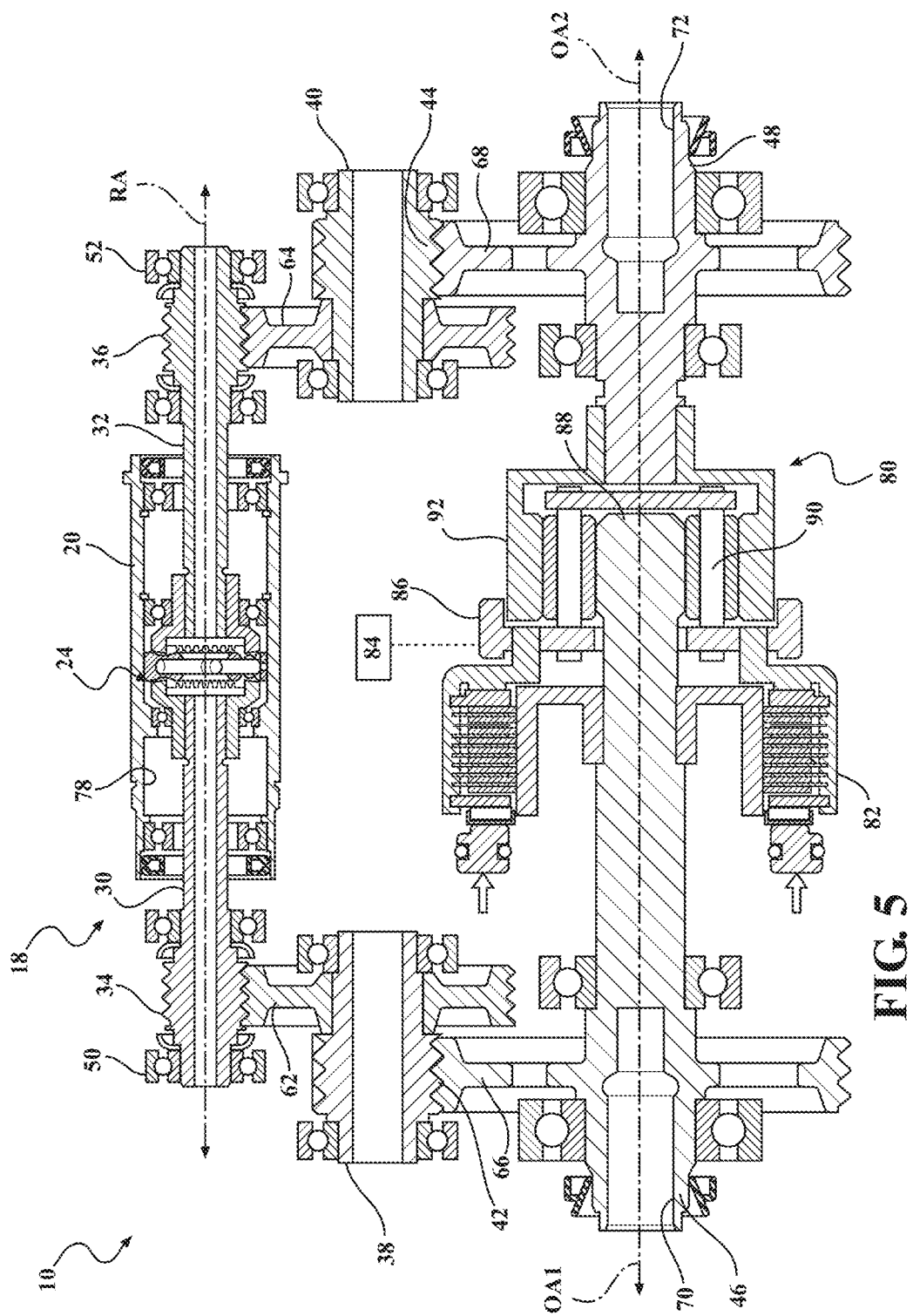
FIG. 5 is a cross-sectional view of another embodiment of the drive module assembly, with the drive module assembly including a gearset, a clutch, and a park lock.
Figure 6:
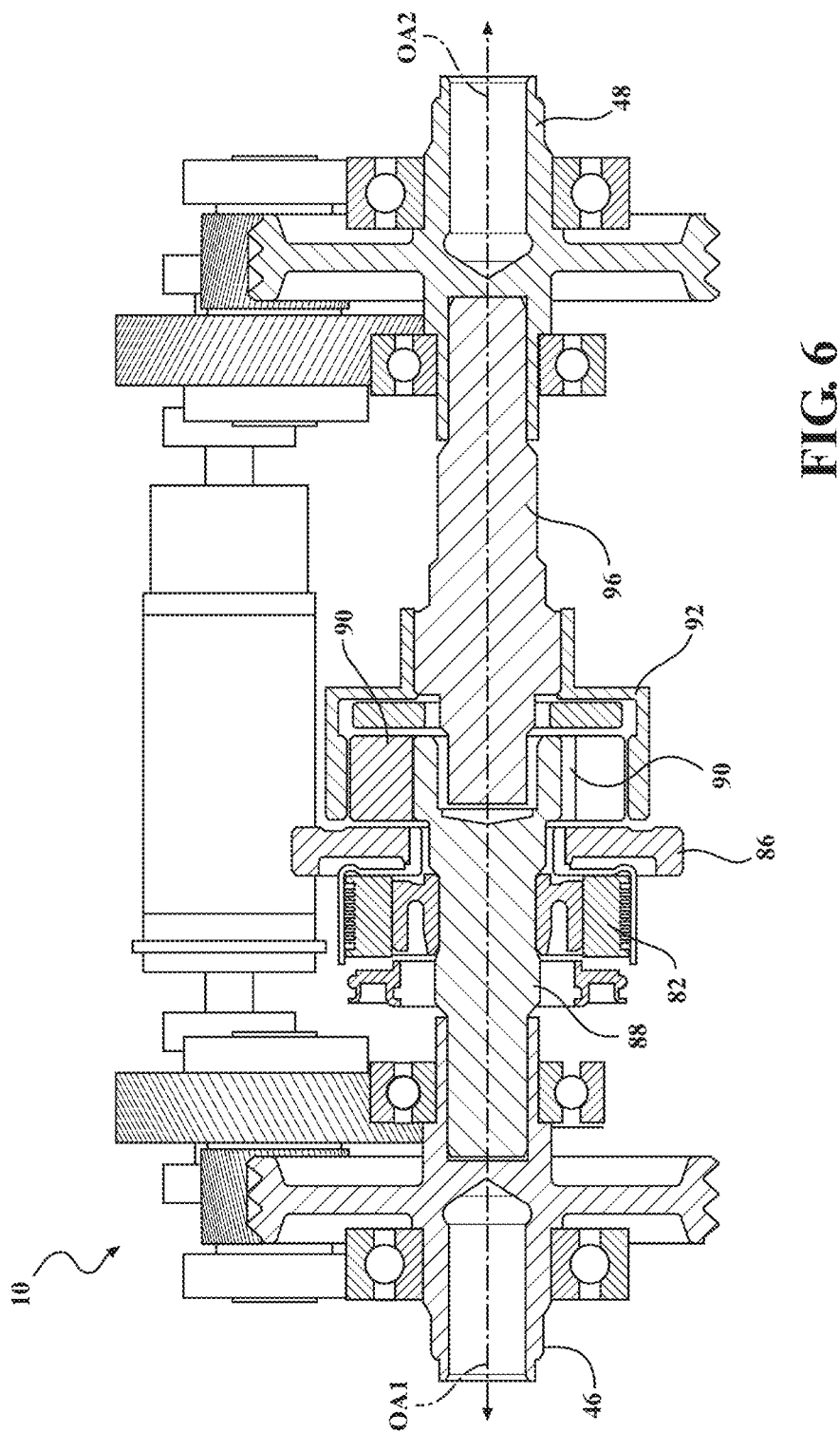
FIG. 6 is a cross-sectional view of the drive module assembly of FIG. 5.

The drive module assembly 10 further includes the differential 24 rotatably coupled to the rotor 20, the first and second input shafts 30, 32, and the first and second output shafts 46, 48. The differential 24 is disposed downstream of at least the rotor 20 such that the differential 24 is configured to receive rotational torque from the rotor 20. In other words, the first and second input shafts 30, 32 and the first and second output shafts 46, 48 may be downstream of the differential 24, as shown in FIGS. 5 and 6, or the differential 24 may be downstream of the first and second input shafts 30, 32 and the first and second output shafts 46, 48. In one embodiment, the differential 24 is configured to receive rotational torque from the electric machine 18 and is configured to transmit rotational torque from the electric machine 18 to the first and second input shafts 30, 32. The differential 24 may be directly coupled to the rotor 20. The differential 24 may be directly coupled to the first and second input shafts 30, 32.

The drive module assembly 10 in the embodiment of FIGS. 5-11 includes a gearset 80 coupled to the first and second output shafts 46, 48 for selectively rotatably coupling the first and second output shafts 46, 48 to one another. As described in further detail below, the gearset 80 may be any suitable gearset, such as a planetary gearset. The drive module assembly 10 further includes a clutch 82 rotatably coupled to one of the first and second output shafts 46, 48 and to the gearset 80. The clutch 82 is actuatable between a first clutch position where the first and second output shafts 46, 48 are uncoupled from one another, which may be alternatively referred to as an open clutch position, and a second clutch position where the first and second output shafts 46, 48 are rotatably coupled to one another through the gearset, which may be alternatively referred to as a closed clutch position. To this end, the clutch 82 may be used for torque vectoring between the first and second output shafts 46, 48. Alternatively, or additionally, the clutch 82 may be used as a limited slip differential. The drive module assembly 10 includes a park lock 84, such as a park pawl, configured to move between a lock position where the park lock 84 is coupled to the gearset 80 such that the gearset 80 and the first and second output shafts 46, 48 are locked, and an unlock position where the park lock 84 is uncoupled from the gearset 80 such that the gearset 80 is unlocked.

The gearset 80, the clutch 82, and the park lock 84 are disposed downstream of the differential 24 such that the gearset 80 and the clutch 82 are configured to receive rotational torque from the differential 24 through the first and second output shafts 46, 48. Having the gearset 80, the clutch 82, and the park lock 84 disposed downstream of the differential 24 such that the gearset 80 and the clutch 82 are configured to receive rotational torque from the differential 24 through the first and second output shafts 46, 48 offers several advantages. First, having the gearset 80, the clutch 82, and the park lock 84 disposed downstream of the differential 24 such that the gearset 80 and the clutch 82 are configured to receive rotational torque from the differential 24 through the first and second output shafts 46, 48 allows for a compact design. Second, having the gearset 80, the clutch 82, and the park lock 84 disposed downstream of the differential 24 such that the gearset 80 and the clutch 82 are configured to receive rotational torque from the differential 24 through the first and second output shafts 46, 48 allows both the clutch 82 and the park lock to have a single actuation system, such as hydraulic actuation.

The drive module assembly 10 may include the first counter shaft 38 rotatably coupled to the first input shaft 30, and the second counter shaft 40 rotatably coupled to the second input shaft 32, with the first output shaft 46 being rotatably coupled to the first counter shaft 38 and the second output shaft 48 being rotatably coupled to the second counter shaft 40.

The first output shaft 46 may extend along a first output axis OA1 and the second output shaft 48 may extend along a second output axis OA2. The first output axis OA1 and the second output axis OA2 may be parallel with one another. In some embodiments, the first output axis OA1 and second output axis OA2 are coaxial with one another.

Typically, the gearset 80 and the clutch 82 are disposed about at least one of the first output axis OA1 and the second output axis OA2. However, the gearset 80 and the clutch 82 may be disposed about both the first output axis OA1 and the second output axis OA2.

The gearset 80 may be further defined as a planetary gearset including a carrier 86, a sun gear 88, a plurality of planet gears 90, and a ring gear 92. As shown in FIGS. 5 and 6, the sun gear 88 is typically rotatably coupled to the first output shaft 46 and, in some embodiments, directly coupled to the first output shaft 46.

Figure 7:
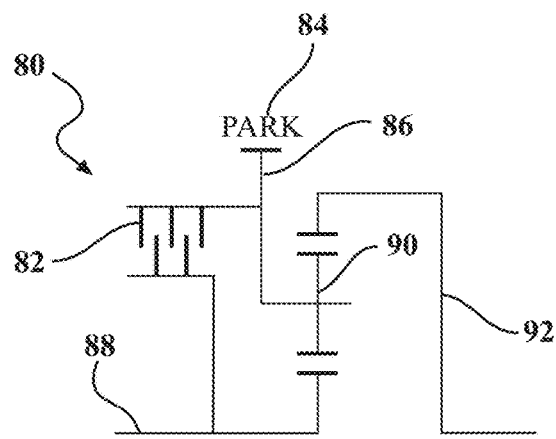
FIG. 7 is a schematic of one embodiment of the gearset, the clutch, and the park lock, where the ring gear is rotatably coupled to the second output shaft, the park lock is engageable with the carrier, the clutch is disposed between the sun gear and the carrier, and the clutch is adjacent the first output shaft.
Figure 8:
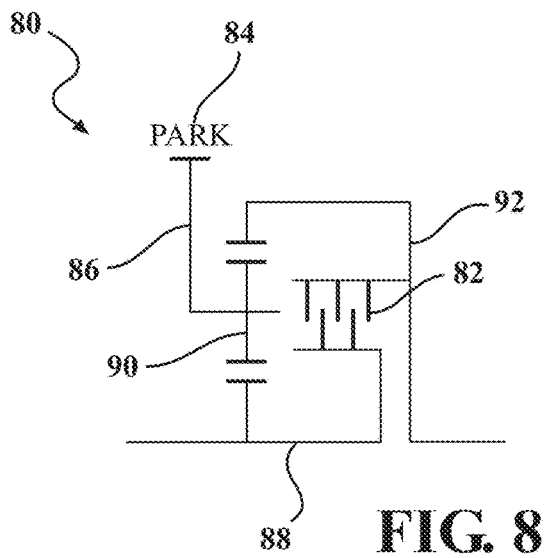
FIG. 8 is a schematic of one embodiment of the gearset, the clutch, and the park lock, where the ring gear is rotatably coupled to the second output shaft, the park lock is engageable with the carrier, the clutch is disposed between the sun gear and the carrier, and the clutch is adjacent the second output shaft.
Figure 9:
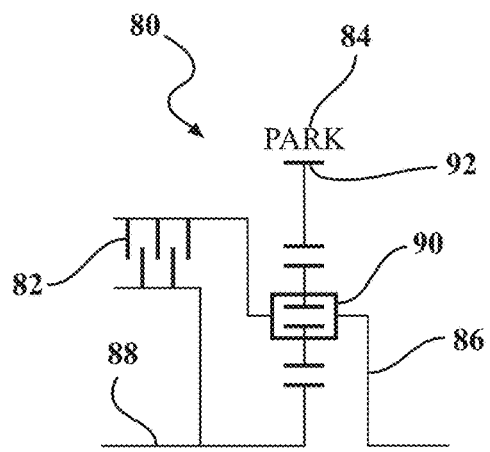
FIG. 9 is a schematic of one embodiment of gearset, the clutch, and the park lock, where the carrier is rotatably coupled to the second output shaft, the park lock is engageable with the ring gear, and the clutch is disposed between the sun gear and the carrier.
Figure 10:
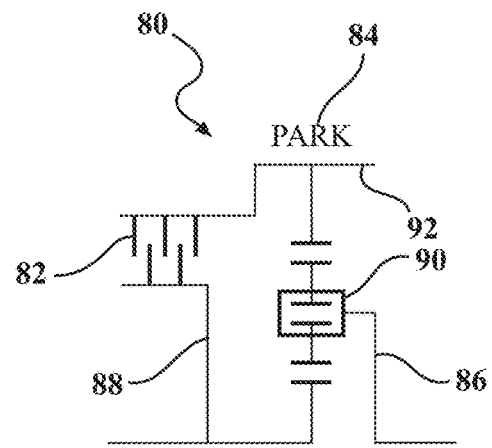
FIG. 10 is a schematic of one embodiment of the gearset, the clutch, and the park lock, where the carrier is rotatably coupled to the second output shaft, the park lock is engageable with the ring gear, and the clutch is disposed between the sun gear and the ring gear.

As illustrated in FIGS. 7 and 8, in one embodiment, the ring gear 92 is rotatably coupled to the second output shaft 48 (e.g. through an intermediate shaft 96 shown in FIG. 6 or directly coupled as shown in FIG. 5), the park lock 84 is engageable with the carrier 86, and the clutch 82 is disposed between and rotatably coupled to the sun gear 88 and the carrier 86. As shown in FIG. 7, the clutch 82 is adjacent the first output shaft 46, and in FIG. 8 the clutch 82 is adjacent the second output shaft 48. With reference to FIG. 9, the carrier 86 is rotatably coupled to the second output shaft 48, the park lock 84 is engageable with the ring gear 92, and the clutch 82 is disposed between and rotatably coupled to the sun gear 88 and the carrier 86. With reference to FIG. 10, the carrier 86 is rotatably coupled to the second output shaft 48, the park lock 84 is engageable with the ring gear 92, and the clutch 82 is disposed between and rotatably coupled to the sun gear 88 and the ring gear 92.

Figure 11:
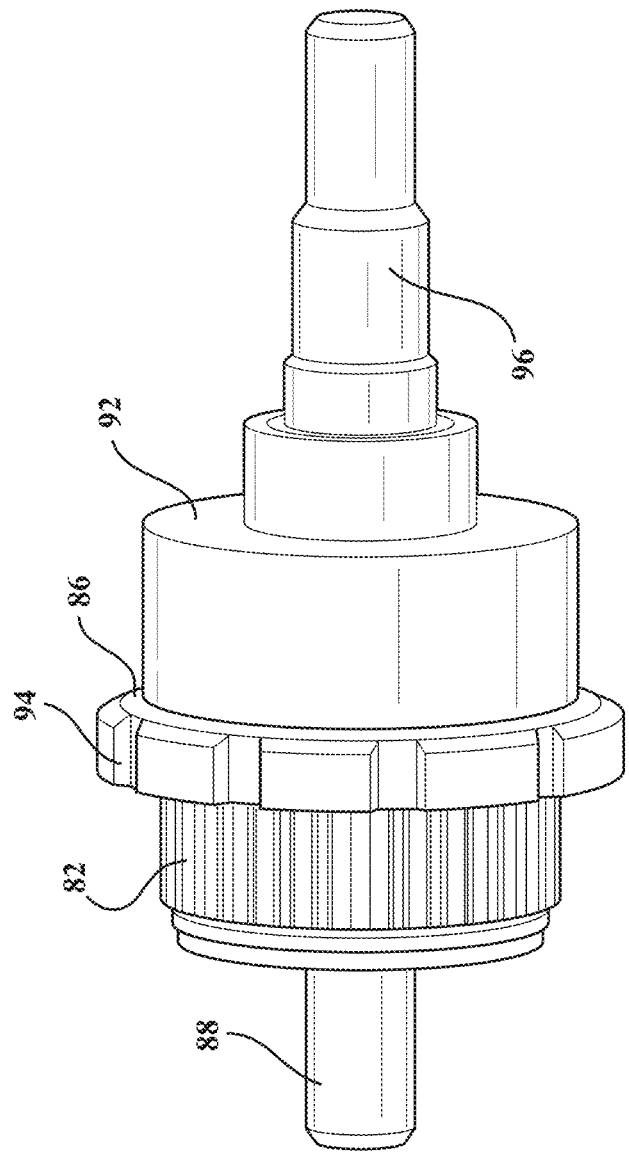
FIG. 11 is a perspective view of the gearset and the clutch.

With reference to FIG. 11, the carrier 86 may include at least one groove 94 configured to receive the park lock 84 when the park lock 84 is in the lock position. The at least one groove 94 may be any suitable configuration, such as a gear shown in FIG. 11.

Figure 12:
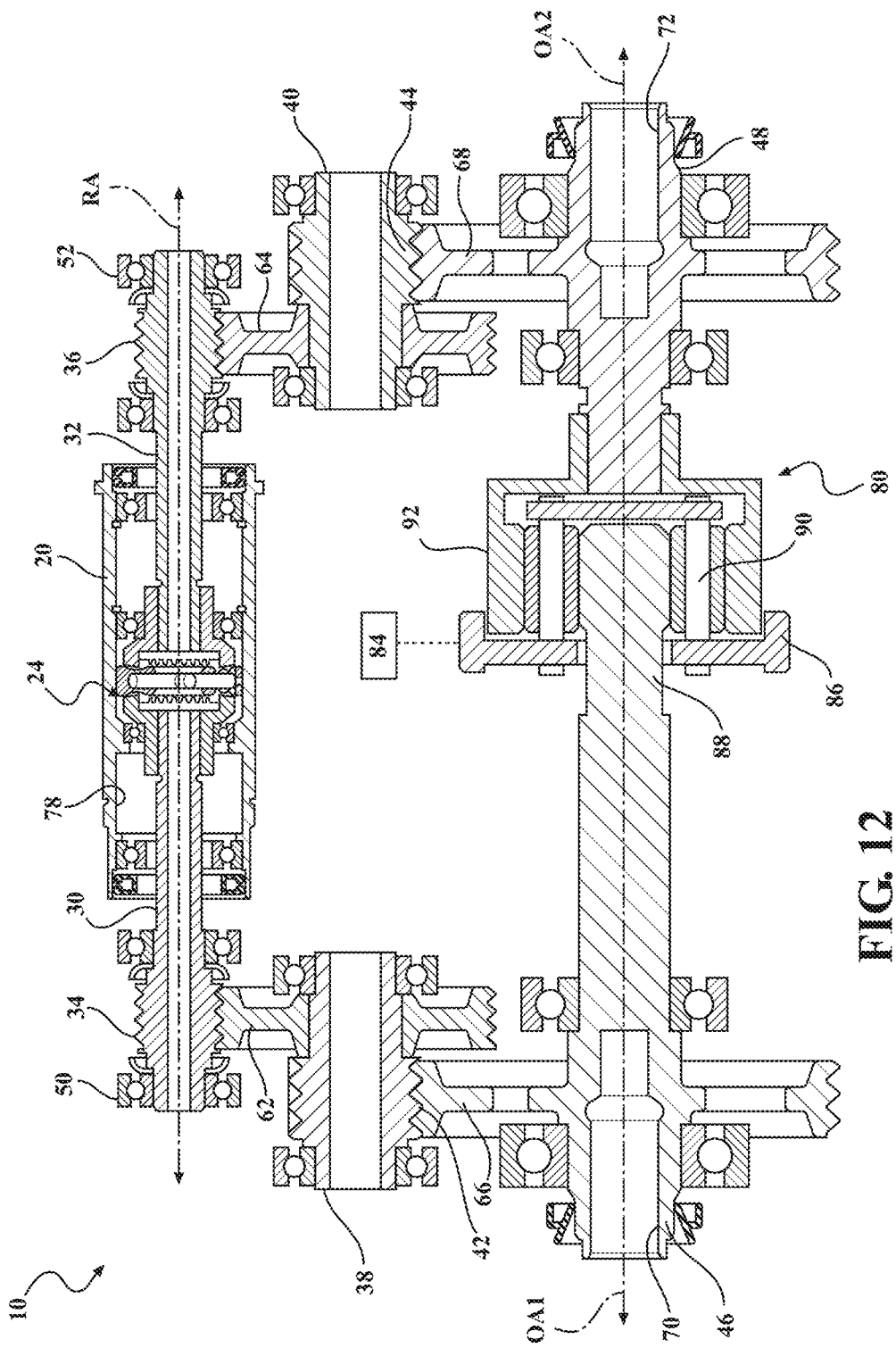
FIG. 12 is another embodiment of the drive module assembly, with the parking lock and the gearset disposed between and rotatably coupled to the first and second output shafts.
Figure 13:
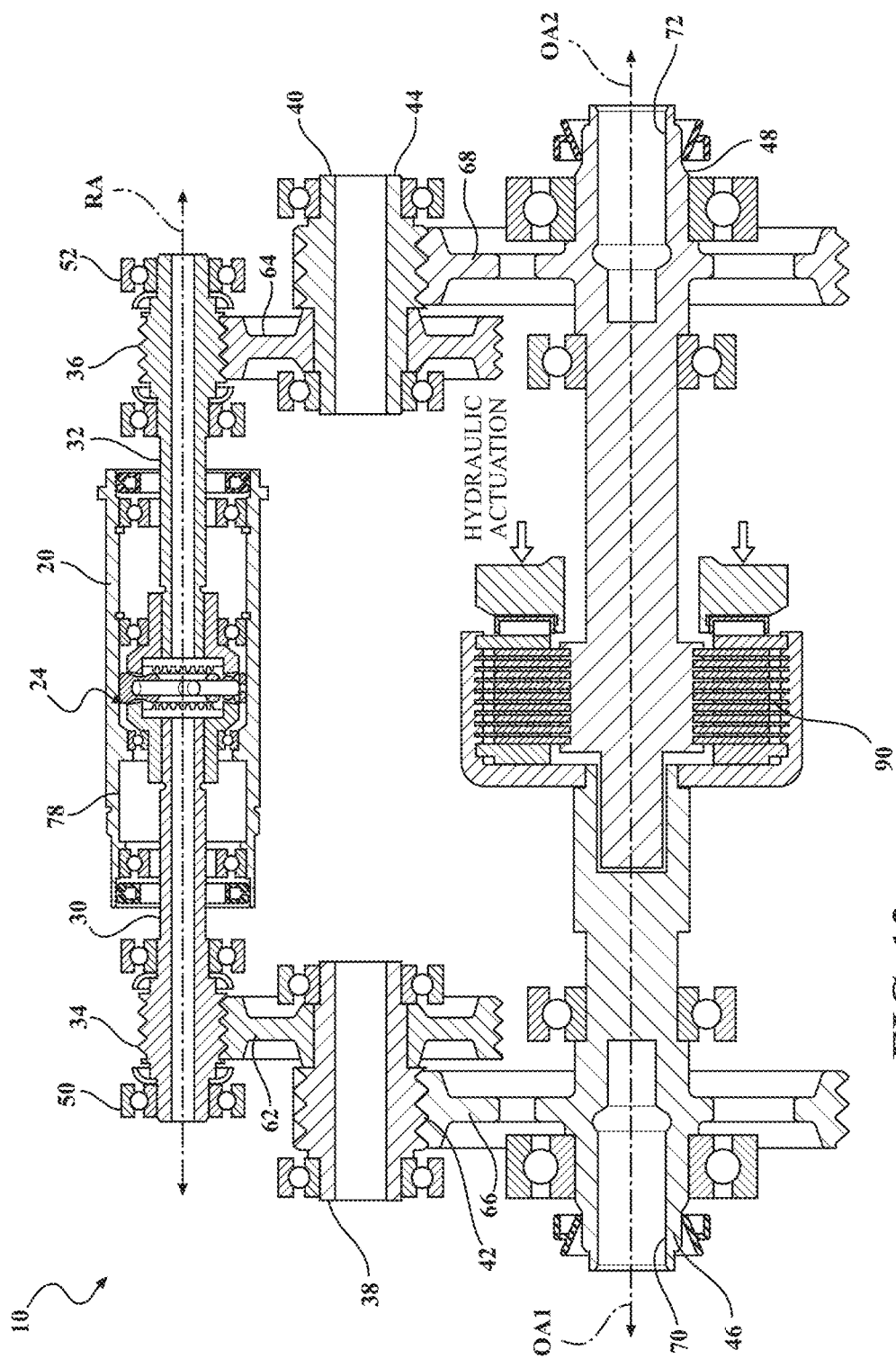
FIG. 13 is another embodiment of the drive module assembly, with the clutch disposed between and rotatably coupled to the first and second output shafts.

It is to be appreciated, such as shown in FIG. 12, that the parking lock 84 and the gearset 80 disposed between and rotatably coupled to the first and second output shafts 46, 48 without the clutch 82. It is also to be appreciated, as shown in FIG. 13, that the clutch 82 may be disposed between and rotatably coupled to the first and second output shafts 46, 48 without the park lock 84.

The rotor 20 may define the rotor interior 78 with the differential 24 disposed in the rotor interior 78. In such embodiments, the rotor 20 may be commonly referred to as a hollow rotor shaft. The first and second input shafts 30, 32 may be disposed in the rotor interior 78 when the rotor 20 is a hollow rotor shaft.

The vehicle may include an internal combustion engine and, therefore, be a hybrid vehicle. The vehicle may also be a battery electric vehicle that is free of an internal combustion engine. It is to be appreciated that the vehicle may include one or more of the drive module assembly 10 described above, such as two drive module assemblies.

What is claimed is:

1. A drive module assembly for use in a vehicle, said drive module assembly comprising:
    a housing defining a housing interior;
    an electric machine, comprising,
        a rotor disposed in said housing interior and extending along a rotor axis, and
        a stator disposed about said rotor with respect to said rotor axis such that said stator surrounds said rotor;
    a first input shaft rotatably coupled to said rotor and disposed downstream of said rotor such that said first input shaft is configured to receive rotational torque from said rotor;
    a second input shaft rotatably coupled to said rotor and disposed downstream of said rotor such that said second input shaft is configured to receive rotational torque from said rotor;
    a first output shaft rotatably coupled to said first input shaft and said rotor and disposed downstream of said rotor and said first input shaft such that said first output shaft is configured to receive rotational torque from said rotor and said first input shaft;
    a second output shaft rotatably coupled to said second input shaft and said rotor and disposed downstream of said rotor and said second input shaft such that said second output shaft is configured to receive rotational torque from said rotor and said second input shaft;
    a differential rotatably coupled to said rotor, said first and second input shafts, and said first and second output shafts, wherein said differential is disposed downstream of at least said rotor such that said differential is configured to receive rotational torque from said rotor;
    a gearset coupled to said first and second output shafts for selectively rotatably coupling said first and second output shafts to one another;
    a clutch rotatably coupled to one of said first and second output shafts and to said gearset, wherein said clutch is actuatable between a first clutch position where said first and second output shafts are uncoupled from one another, and a second clutch position where said first and second output shafts are rotatably coupled to one another through said gearset; and
    a park lock configured to move between a lock position where said park lock is coupled to said gearset such that said gearset and said first and second output shafts are locked, and an unlock position where said park lock is uncoupled from said gearset such that said gearset is unlocked;
    wherein said gearset, said clutch, and said park lock are disposed downstream of said differential such that said gearset and said clutch are configured to receive rotational torque from said differential through said first and second output shafts.

2. The drive module assembly as set forth in claim 1, wherein said first output shaft extends along a first output axis and said second output shaft extends along a second output axis, and wherein said first output axis and said second output axis are parallel with one another.

3. The drive module assembly as set forth in claim 2, wherein said first output axis and said second output axis are coaxial with one another.

4. The drive module assembly as set forth in claim 2, wherein said gearset and said clutch are disposed about at least one of said first output axis and said second output axis.

5. The drive module assembly as set forth in claim 4, wherein said gearset and said clutch are disposed about both of said first output axis and said second output axis.

6. The drive module assembly as set forth in claim 1, wherein said gearset is further defined as a planetary gearset comprising a carrier, a sun gear, a plurality of planet gears, and a ring gear.

7. The drive module assembly as set forth in claim 6, wherein said sun gear is rotatably coupled to said first output shaft.

8. The drive module assembly as set forth in claim 7, wherein said ring gear is rotatably coupled to said second output shaft, wherein said park lock is engageable with said carrier, and wherein said clutch is disposed between and rotatably coupled to said sun gear and said carrier.

9. The drive module assembly as set forth in claim 7, wherein said carrier is rotatably coupled to said second output shaft, wherein said park lock is engageable with said ring gear, and wherein said clutch is disposed between and rotatably coupled to said sun gear and said carrier.

10. The drive module assembly as set forth in claim 7, wherein said carrier is rotatably coupled to said second output shaft, wherein said park lock is engageable with said ring gear, and wherein said clutch is disposed between and rotatably coupled to said sun gear and said ring gear.

11. The drive module assembly as set forth in claim 6, wherein said ring gear is rotatably coupled to said second output shaft, wherein said park lock is engageable with said carrier, and wherein said clutch is disposed between and rotatably coupled to said sun gear and said carrier.

12. The drive module assembly as set forth in claim 11, wherein clutch is adjacent said first output shaft.

13. The drive module as set forth claim 11, wherein said clutch is adjacent said second output shaft.

14. The drive module assembly as set forth in claim 6, wherein said carrier is rotatably coupled to said second output shaft, wherein said park lock is engageable with said ring gear, and wherein said clutch is disposed between and rotatably coupled to said sun gear and said carrier.

15. The drive module assembly as set forth in claim 6, wherein said carrier is rotatably coupled to said second output shaft, wherein said park lock is engageable with said ring gear, and wherein said clutch is disposed between and rotatably coupled to said sun gear and said ring gear.

16. A vehicle comprising said drive module assembly as set forth in claim 1.

17. A vehicle comprising said drive module as set forth in claim 1, wherein said vehicle comprises an internal combustion engine.

18. A vehicle comprising said drive module as set forth in claim 1, wherein said vehicle is free of an internal combustion engine.

\* \* \* \* \*